Patented July 21, 1942

2,290,313

UNITED STATES PATENT OFFICE 2,290,313

PROCESS FOR SEPARATING NICKEL AND COBALT IN SOLUTIONS

Martinus H. Caron, The Hague, Netherlands

No Drawing. Application May 28, 1941, Serial No. 395,671. In the Netherlands April 11, 1939

3 Claims. (Cl. 75—108)

This invention relates to a process for separating nickel and cobalt in a solution wherein, in addition to said metals and to unavoidable traces of impurities, ammonia and carbon dioxide only are present, i. e. in a liquid as referred to in my prior U. S. specification No. 1,487,145, and containing, for example, Ni 2%, Co 0.1%, $NH_3$ 6% and $CO_2$ 4%.

As stated in said prior specification, basic nickel carbonate can be precipitated by subjecting to distillation a solution of the general type stated, but not containing cobalt in addition to nickel. Said salt can readily be converted into pure nickel oxide by heating. If, however, also an appreciable proportion of cobalt is present in the solution, then, after the whole amount of ammonia has been distilled off, the precipitate contains basic carbonates of both nickel and cobalt, so that it is not possible to recover pure nickel oxide simply by heating the precipitate.

I have now discovered that during the first stage of the distillation of a solution of the aforesaid type containing both nickel and cobalt, the precipitate consists almost exclusively of basic nickel carbonate and substantially the entire proportion of cobalt remains in solution as a very stable cobalti compound,—and that cobalt is precipitated only in the last stage. In accordance with my invention, said discovery is turned to advantage by interrupting distillation of said solution as soon as an appreciable proportion of cobalt begins to form, and by isolating the precipitated basic nickel carbonate which contains only a negligible amount of cobalt. In the clear liquor, almost the entire amount of cobalt will then still be present in cobalti condition. From said liquor, cobalt can readily be extracted in a very pure condition after precipitation of the relatively small amount of nickel still present therein.

Since in practice the proportion of cobalt in the original solution is small relative to that of nickel, it is obviously of primary importance first to precipitate nickel therefrom, as the liquor then still contains only a small proportion of ammonia and the precipitate can consequently be isolated therefrom in open vacuum filters, without loss of any considerable amount of $NH_3$.

Distillation may, for instance, be carried out under vacuum or partial vacuum, or by heating the solution and passing a suitable gas therethrough so as to more readily expel the ammonia.

It is pertinent here to remark that the use of carbon dioxide, or of a gaseous mixture containing carbon dioxide, for the purpose stated has the advantage to still further reduce the amount of cobalt in the basic nickel carbonate precipitated in the first stage of distillation.

Example

A nickeliferous and cobaltiferous ammoniacal solution of ammonium carbonate was subjected to a four stage distillation, and the four precipitates so formed were isolated, the result being:

| | Amount in milligrams of— | | Proportion of Co |
|---|---|---|---|
| | Ni | Co | |
| In first precipitate | 563.1 | 0.60 | Per cent 0.107 |
| In second precipitate | 5,623.1 | 6.24 | 0.111 |
| In third precipitate | 281.0 | 17.62 | 5.9 |
| In fourth precipitate | 134.7 | 48.1 | 26.3 |

Thus, more than 90% of the total amount of cobalt present in the ammoniacal solution was concentrated in the last two precipitates, and these contained only 6.3% of the total amount of nickel. The first two precipitates contained 93.7% of the nickel, the proportion of cobalt thereof being lower than that of electrolytic nickel. It may be anticipated that still better results will be obtainable when my process will be worked on a commercial scale.

What I claim is:

1. In the separation of nickel and cobalt from solutions containing, in addition to these metals and to unavoidable impurities, ammonia and carbon monoxide only, the process which comprises heating and concentrating such a solution, thereby causing the initial precipitation of basic nickel carbonate, stopping the heating and concentration substantially as soon as cobalt begins to precipitate in insoluble form, then separating the resulting basic nickel carbonate precipitate in substantially pure form.

2. The process of claim 1 wherein the said heating and concentration is conducted under vacuum conditions.

3. The process of claim 1 wherein during said heating carbon dioxide is passed through said solution.

MARTINUS H. CARON.